United States Patent [19]
Armstrong et al.

[11] 3,742,373
[45] June 26, 1973

[54] PULSE GENERATORS

[75] Inventors: John Patrick Armstrong, Flackwell Heath; Melvin Alexander Tennant, Holmer Green, both of England

[73] Assignee: Perkin-Elmer Limited, Beaconsfield, Bucks, England

[22] Filed: Nov. 5, 1971

[21] Appl. No.: 196,013

[30] Foreign Application Priority Data
Nov. 6, 1970 Great Britain.................. 52,903/70

[52] U.S. Cl............... 328/63, 307/235, 307/252 B, 307/752 UA, 307/262, 307/269, 323/19, 323/24
[51] Int. Cl........................ H03k 1/02, H03k 1/16
[58] Field of Search ................ 307/252 UA, 252 B, 307/262, 269, 235; 328/63; 323/19, 24

[56] References Cited
UNITED STATES PATENTS

| | | | |
|---|---|---|---|
| 3,253,157 | 5/1966 | Lemon, Jr..................... | 307/269 X |
| 3,155,879 | 11/1964 | Casey et al. .................... | 307/301 X |
| 3,193,696 | 7/1965 | Waldron ........................ | 307/301 X |
| 3,226,627 | 12/1965 | Fromkin ........................ | 307/301 X |
| 3,244,964 | 4/1966 | Greening et al. ............... | 307/301 X |

Primary Examiner—John Zazworsky
Attorney—Edward R. Hyde, Jr.

[57] ABSTRACT

A trigger pulse generator circuit for controlling, for example, an AC thyristor system which in turn controllably supplies a final device (e.g, an electrical heater for a temperature-controlled oven), in which the relative number of pulses supplied (of the maximum possible during a given period) is proportional to the input ("demand") signal. Thus the supply to the final device is quantitatively proportional to the measured demand (e.g., by a temperature sensor), thereby causing close tracking of the desired condition (e.g., temperature). In fact, the entire system may be operated in the "open loop" mode since the supply inherently tends to match quantitatively the required amount (i.e., the "demand") to cause the final device to reach a desired setpoint. In closed loop operation, excursions of the effect of the final device from the setpoint are smaller than with existing systems using nonquantitatively supplied pulses where any time lag in the sensor relative to the condition will tend to cause "overshoot" (e.g., too many pulses before the sensor responds to the change).

7 Claims, 6 Drawing Figures

PULSE GENERATORS

The present invention relates to pulse generators generally, and in particular to trigger pulse generators for firing thyristors and the like devices in proportional AC controllers, especially of the type incorporating zero-voltage switching. The invention also concerns such AC controllers embodying said trigger pulse generators.

Proportional control of AC power in combination with zero-voltage switching is being widely used in industry for many diverse applications, among which temperature regulation is common. Most of the present controllers of this type are intended for closed-loop operation, in which the proportioning of the number of complete cycles during which current is supplied to a load in relation to the number of complete cycles during which current is cut off depends entirely on the output of a sensor associated with the load.

A trigger pulse generator employed in a typical known controller comprises a generator of synchronizing pulses which produces a standard pulse each time the supply voltage crosses the zero line (thereby producing a regularly spaced sequence of pulses). The amplitude of a synchronizing pulse alone is not sufficient to trigger the power thyristor (which supplies the final device, e.g., electrical heater) until the sum of the amplitudes of the pulses and that of an error signal have reached a predetermined value. The error signal is accumulated in a capacitor, and when the sum of the accumulated error signal and a pulse (that is, the peak of the synchronizing pulse "riding" on the accumulated error signal) reaches said predetermined value, the firing of the thyristor will occur. The capacitor is reset, by discharging, every time the thyristor conducts, the magnitude of the error signal (as again accumulated) determining when the next firing of thyristor will occur and so on.

It will be easily appreciated that in a system as described, control can only be maintained if the error signal rises and falls alternately, that is, only if the "error signal" is an actual measure of the condition being controlled as by being the output of a sensor directly measuring such condition (e.g., temperature). Stated in other words, such a system operates properly only as a "closed loop" system. Thus every time the system is activated, it "does not know" what the demand is until the sensor says "enough"; and every time it is de-activated, it "does not know" how long it should stay inactive until the sensor says "come on". This means that the system cannot regulate properly if the loop closed by the interaction of the load and the sensor is substantially disabled. The best that it could then achieve would be an on-off operation with limited proportionality between supply and demand. It follows that even in the closed-loop mode the response is largely governed by the parameters of the load (e.g., thermal capacity, lag and the like when the controlled device is a heater), and the system response must be carefully matched to the task. Where the (thermal) conditions are subject to wide fluctuations, considerable over- and under-shoot could take place.

According to the present invention there is provided a pulse generator capable of producing an output condition wherein an output pulse (or an absence of a pulse) can occur only during any one of a series of discrete equally spaced time intervals, and the number of successive pulses in relation to the number of successive "no-pulses" that are made to occur in a particular series (or sequence or period) corresponds to a demand within a predetermined range as represented by a selected signal level sustained at the input of the generator. The output condition can thus quantitatively vary in each period from the occurrence of one pulse followed by a predetermined maximum number of "no-pulses" at the lower end of the range, to the occurrence of a predetermined maximum number of successive pulses followed by one no-pulse towards the higher end of the range.

The pulse generator may be synchronized with respect to an AC supply, e.g., the main supply, so that the pulse or no-pulse state can only be established when the AC waveform is at or very near the zero crossing, thus enabling the pulse generator to be used as a trigger pulse generator for firing a thyristor circuit operating in the zero-voltage switching mode in an AC power controller system.

The thyristor circuit may be arranged to switch either complete half-cycles or complete full-cycles to the load; and the pulse generator may then be used to control its output so that for any level of power demand, selectable at will by the user within a predetermined range, there is a predetermined on/off ratio of complete power cycles or half-cycles to satisfy that demand. This means that the controller is able to function in the open-loop mode; and when closed-loop conditions are superimposed, the power excursions of the controller around the set point are considerably narrowed.

According to a more specific aspect of the invention there is provided a pulse generator, comprising: a comparatively low-level input network or circuit stage having an input signal threshold which, whenever it is exceeded by the signal, causes a dependent comparatively high-level network or circuit stage to produce an output pulse at the beginning of one of a series of discrete equally spaced time intervals; a first accumulating device and a second accumulating device in said input network connected for accumulating in parallel the value of a given input signal and operatively connected so that no output pulse can be produced unless both devices have accumulated a signal value exceeding said threshold; and means for discharging the second accumulating device upon said output pulse being produced without however substantially affecting the first accumulating device, the pulse generator being so constituted and arranged that in operation after the second accumulating device is discharged the first device will share its accumulated value with the second device; for any fixed input signal level the on-off ratio of the output pulses will depend on the extent by which the time constant of the first accumulating device exceeds that of the second device, in that the time constant differential governs the number of discrete time intervals that must elapse before the threshold is exceeded again after the occurrence of an output pulse.

An object of the invention is the provision of a pulse generator in an AC controller wherein the number of output actuating pulses is proportional to the amplitude of the input signal signifying the departure of the system being controlled from the desired set-point.

A related object is the provision of such a pulse generator type controller in which the loop between the system being controlled and sensor supplying the input signal may be opened without disabling the controller from tending to make the controlled system reach the desired set-point.

Other objects, advantages and features of the invention will be obvious from the single exemplary embodiment of a pulse generator circuit in accordance with the invention, which for purposes of clarity and simplicity of understanding is assumed to be used, for example, in an AC controller operating by zero-voltage switching of the load in the exemplary environment of temperature regulation of an oven (e.g., for an analytical instrument, such as a chromatograph), which single embodiment is described in detail in conjunction with the accompanying drawings, in which:

FIG. 1 schematically illustrates an exemplary trigger pulse generator according to the invention in a generalized usage;

FIG. 1a schematically illustrates an alternative arrangement of a part of the trigger pulse generator shown in FIG. 1.

Figure 1:
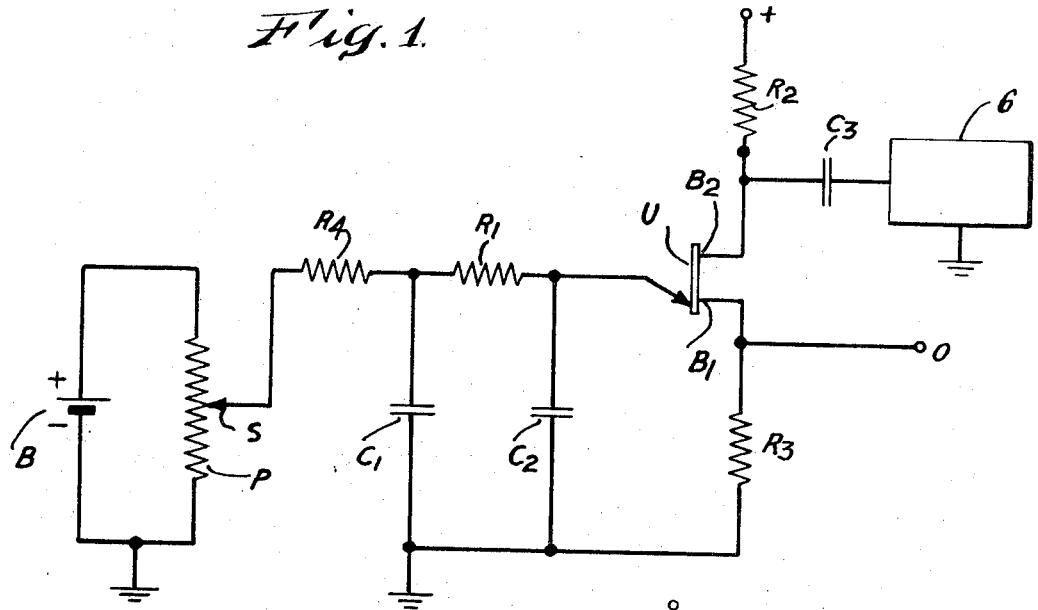
Figure 3:
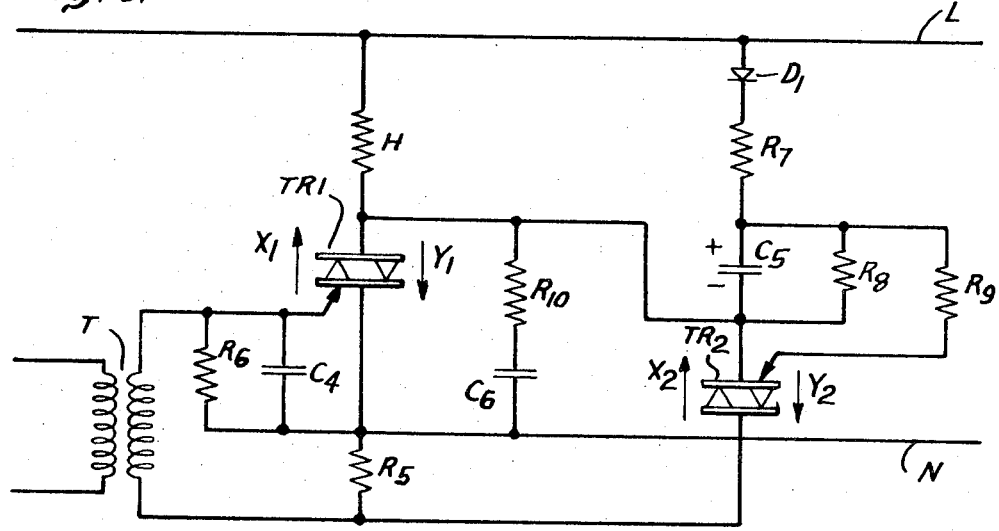
FIG. 3 is an electrical schematic of an exemplary triac control circuit ultimately controlled by the pulses, after stretching, generated by the circuit according to FIG. 1.
Figure 4:
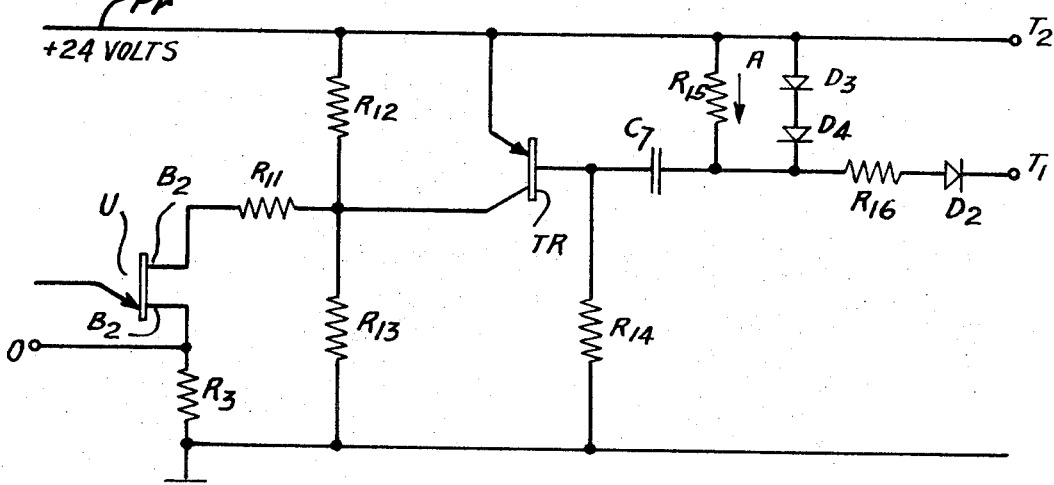
Figure 5:
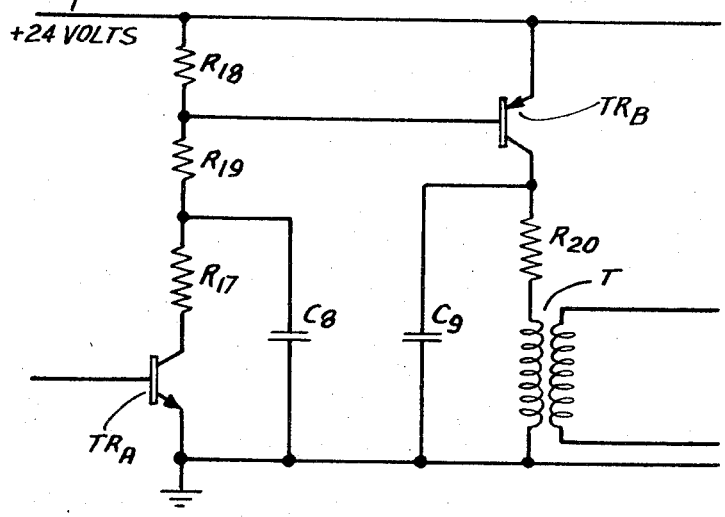

FIG. 4 is an electrical schematic of an exemplary synchronizing circuit operating on a zero-crossing detection principle, for causing timing of the possible output pulses generated by the FIG. 1 circuit; and FIG. 5 is an electrical schematic of an exemplary pulse-stretching circuit positioned between the output of the trigger pulse generator of FIG. 1 and the triac circuit of FIG. 3, to lengthen (the time of) the pulses before they are applied to actuate the triac control circuit.

Figure 1A:
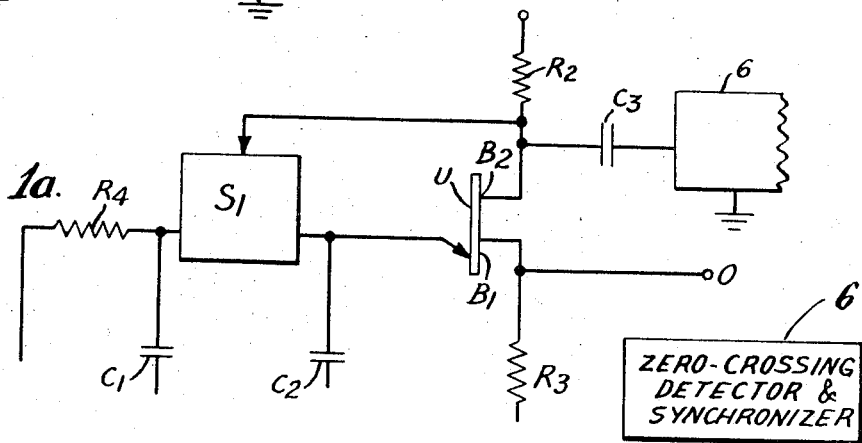

FIG. 1 serves to illustrate the broad principle on which a trigger pulse generator according to the present invention may be realized. The emitter circuit of a unijunction U constitutes a comparatively low-level input network or circuit stage and comprises a first accumulating device in the form of capacitor $C_1$, a second accumulating device in the form of capacitor $C_2$, and a paralleling resistor $R_1$. The comparatively high-level circuit stage associated with bases $B_1$ and $B_2$ of the unijunction U constitutes a dependent network comprising resistors $R_2$ and $R_3$, the latter being in fact common to both stages. A semiconductor switch, $S_1$ say an FET, which momentarily opens just before the unijunction fires, could replace resistor $R_1$, as indicated in FIG. 1a.

A potentiometer P energized by battery B enables a variable input signal to be provided by simply adjusting the slide S connected to the junction between $R_1$ and $C_1$ through resistor $R_4$. This form of input lends itself more readily to illustrating the open-loop characteristics of the trigger pulse generator of FIG. 1 although a constant-current input arrangement would be preferred in actual practice, as will be seen hereinafter.

Unijunction U will of course fire every time a positive voltage to its emitter rises above the threshold voltage $V_P$. A voltage step will then appear between output terminal O and ground, which can be used to trigger for example a thyristor device, such as a triac, for controlling an AC load.

Now, it is well known that the threshold voltage $V_p$ varies proportionally to interbase voltage, which means that: if the voltage at the base $B_2$ is suddenly lowered for a short time interval, the $V_p$ is lowered too; and if the input voltage happens to exceed the lower $V_p$ in that interval, the unijunction will fire. Unit 6 is provided to produce a short negative pulse which through capacitor $C_3$ is applied to $B_2$ and lowers the (positive) voltage thereat at the time the AC voltage waveform crosses the zero line. It acts, therefore, as a synchronizer ensuring that AC power can only be switched to the load near the zero crossing. As will be seen hereinafter, other means for momentarily dropping the voltage at B (in synchronizism with zero-crossing of the AC voltage) may be used in place of 6 and $C_3$.

A conventional thyristor requires a minimum positive voltage of its anode relative to its cathode before it can fire. This means that the pulse for firing the thyristor, which is derived from the output produced at terminal O, must be effective simultaneously with the positive voltage at the thyristor anode having reached the minimum value referred to. In order to make sure that a triggering pulse is available as soon as the anode voltage of the thyristor is high enough for conduction to be started, the triggering pulse at O is preferably initiated when the common AC waveform (used in both circuits) is nearly at the end of the negative half-cycle and for the pulse then to be stretched through the remainder of the negative half-cycle, through the zero crossing and sufficiently into the beginning of the positive half-cycle to ensure reliable firing of the thyristor despite the slight variation of the minimum anode voltage for conduction that is experienced in production from one thyristor to another of the same type. A specific synchronizer for starting the trigger pulse before the end of the negative half-cycle and for stretching this pulse into the beginning of the following positive half-cycle will be described later with reference to FIGS. 4 and 5, respectively.

It will be appreciated that when a thyristor has been turned on by a trigger pulse near the zero crossing it will stay on up to almost the next zero crossing. In other words, a conventional thyristor with a single anode to cathode path will only supply complete half-cycles of power when switched in the zero-voltage mode. Half-wave AC controllers are of course useful, especially where cost is a very important consideration, but a full-wave operation basically requires only an added arrangement for slave firing a second thyristor as will be seen hereinafter (with reference to FIG. 3). A triac is a triode thyristor which offers in a single package the equivalent of an inverse-parallel SCR pair. One member of the pair can be used as the master SCR and the other as the slave SCR, if so desired. In the specific exemplary AC controller disclosed hereinafter the final AC power to the load is in fact handled through a triac, with the master SCR member (hereinafter called master SCR) fired in response to an output from terminal O to provide one half-cycle of power to the load, while the slave SCR member (hereinafter called slave SCR) fired in response to a pulse from a slave triggering circuit, supplies the next half-cycle of power.

Returning to the trigger pulse generator of FIG. 1, its major function is to adjust the number of complete cycles during which power is on to the number of complete cycles during which power is off so as to meet in a substantially proportional manner the power demand as set (in the exemplary input signal of FIG. 1) by the slider S of potentiometer P, it being assumed of course that the load (i.e., the ultimately controlled device) is effectively able to integrate the bursts of power (as is in fact the case with the heating coils of a chromatographic oven).

It is clear that the trigger pulse generator will give no output unless the slider S has tapped off a voltage which exceeds the threshold voltage $V_p$ of the unijunction as lowered by the synchronizing pulse from unit 6. We assume, therefore, that the potentiometer P has been set to allow the $V_p$ as defined to be slightly exceeded. Capacitors $C_1$ and $C_2$ charge up in parallel and when the voltage across $C_2$ becomes greater than $V_p$ the unijunction fires (as soon as the next synchronizing pulse appears on $B_2$) and an output pulse is produced at 0. $C_2$ is now discharged, because the emitter to base $B_1$ path becomes of low impedance, but $C_1$ does not discharge to any substantial extent in the short time during which the emitter to base resistance is lowered (U only firing for a short time of course) because the time constant $C_1R_1$ is chosen to be much greater than the time constant $C_2R_3$. With $C_2$ discharged, charge sharing between $C_1$ and $C_2$ follows, and simultaneously the two capacitors draw current from the potentiometer P and charge up again towards $V_p$.

Whether the unijunction U having once triggered will trigger again at the occurrence on $B_2$ of the next synchronization pulse near the next cross-over from negative to positive half-cycle will naturally depend on whether $C_2$ has meantime charged up again to a voltage which exceeds $V_p$. For a constant input (at S) the time taken for the voltage across $C_2$ to exceed $V_p$ depends on how far $C_2$ was discharged at the previous firing of the unijunction, and how effective is $C_1$ in building up the charge $C_2$. The values of $C_1$, $C_2$ and $R_1$ may be so chosen that for a (particular, relatively low) setting of the potentiometer P representing the lower limit of use it will take a time corresponding to any desired number of complete cycles of the AC supply for $C_2$ to build up again after it has been discharged. This means that a burst of one complete cycle of power to the load is followed by a conveniently large number of cycles during which no power is supplied. At the actual lowest setting of potentiometer P (i.e., below this particular relatively low setting), the load will receive no power at all.

If the input voltage is increased (e.g., by manual movement of slider S), the greater potential difference across the capacitors enables $C_2$ to build up beyond $V_p$ in a time corresponding to a smaller number of complete AC cycles until the no-pulse gap following an output pulse narrows until it becomes only one AC-cycle wide to yield alternate on and off cycles. As the input is increased slightly more, the next step up in power is given by two cycles on and one off, followed by three on and one off and so on. In other words, starting from a minimum setting, power is increased during a first part of the power range by narrowing the no-pulse gap between actual pulses from a convenient maximum number of complete cycles to a minimum of one cycle; and during a second part of the range, by widening the power-on interval (i.e., consecutive pulses) from a minimum of one cycle to a point near the upper limit, when many cycles of power-on are infrequently interrupted by a one-cycle wide no-pulse gap. At the maximum power setting every cycle is a power-on cycle.

The pulse generator as described obviously works in the open-loop mode (since FIG. 1 is an open loop system as shown), but it is possible to superimpose a closed-loop characteristic by replacing the potentiometer P with means for producing a DC signal proportional to the difference between a desired level of power as set by an adjustable reference and the actual power as monitored by a sensor (thermally) coupled to the load. It will be appreciated that even when working closed-loop, the system does not have to turn on and off, that is, it does not have to change from a no-pulse to a pulse-generating condition, in order to regulate. In fact, since the system can maintain a given (average) power output for a constant input (at S) to the trigger pulse generator, it is possible (and generally preferable) to bias the input correspondingly to the demand expected under "normal" or average conditions and to use the closed loop to apply a small correction above and below this "normal" or average input. This provides a more linear control because capacitors $C_1$ and $C_2$ would then charge up over a narrower portion of their exponential characteristic and thus provide a better proportionality between power output and power demand. In terms of a practical realization, we may arrange for a constant current amplifier feeding into $C_1$ and $C_2$ to be driven by a voltage amplifier, as will be seen hereinafter.

Figure 2:
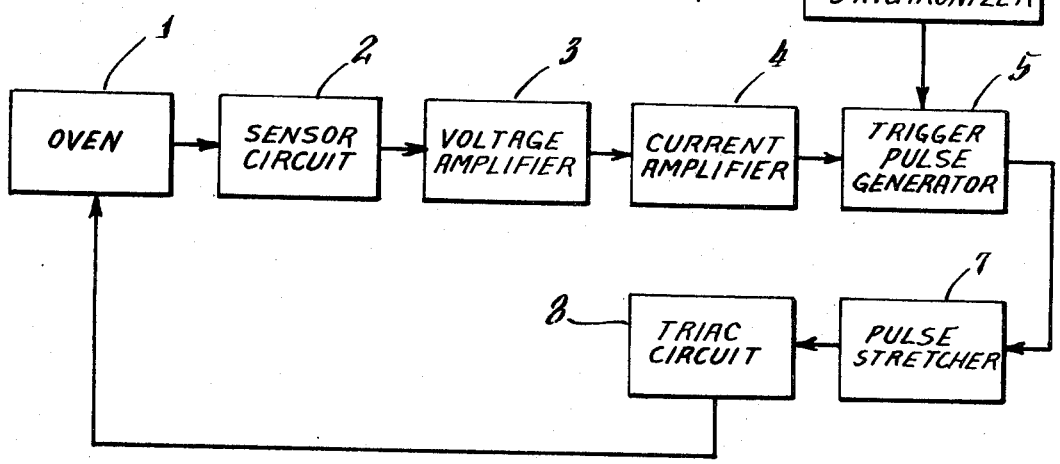
FIG. 2 shows in block diagram form a complete AC controller system in the exemplary usage of temperature regulation of a temperature programmed chromatographic oven, showing the manner in which a trigger pulse generator according to FIG. 1 may be incorporated in such controller system.

The block diagram of FIG. 2 broadly indicates a complete proportional AC controller incorporating a trigger pulse generator in accordance with the present invention. The controller is intended in this exemplary system for the temperature regulation of a variable temperature chromatographic oven, but it can naturally be adapted for other electrical heating applications or even different types of controlled systems. It has been designed for closed-loop operation but the trigger pulse generator imparts to it an open-loop mode of operation which in the absence of system disturbances is able to proportion supply to demand. Such open-loop mode is useful to "program" the temperature of an oven (i.e., increase the temperature in some manner expressed as a function of added "programmed" heat energy).

In FIG. 2, a sensor having a temperature coefficient of resistance is placed in a chromatographic oven 1. The sensor output is compared with a reference resistor in circuit 2, for example, a Wheatstone-type bridge. The difference signal is passed to a voltage amplifier 3, which drives current amplifier 4, feeding into the junction between capacitor $C_1$ and resistor $R_1$ (and $R_4$) of the trigger pulse generator shown in FIG. 1, which with the omission of the potentiometer input (i.e., B, P, S and $R_4$) is represented by block 5 in FIG. 2.

The output of trigger pulse generator 5, synchronized by zero voltage detector and synchronizer 6, is fed to pulse stretcher 7, which ensures that a trigger pulse initiated towards the end of the negative half-cycle of the AC supply is made sufficiently "wide" (i.e., long in time) to terminate when the next positive half-cycle has risen sufficiently to reach the minimum anode voltage for conduction likely to be met (allowing for tolerances in different elements) in a suitable triac chosen for controlling the AC power to the chromatographic oven. The stretched triggering pulse is applied to the gate of the triac's master SCR, the triac and the slave triggering circuit for the slave SCR being included in block 8. The line from circuit 8 to 1 merely denotes that the power to (the heater of) the oven is controlled by the former.

A full-wave triac circuit, suitable for use in FIG. 2 as block 8, is shown in some detail in FIG. 3, wherein the stretched pulse produced by stretcher 7 (FIG. 2) is introduced via mains-isolation transformer T and through resistor $R_5$ in series with the transformer secondary, across the parallel combination of capacitor $C_4$ and resistor $R_6$, shunted between the gate and cathode of the master SCR forming one half of the triac $TR_1$. Capacitor $C_4$ acts as a safeguard against spurious transients which may be expected to have sufficient energy to charge up the capacitor to the gating voltage referred to. Resistor $R_6$ provides a leakage path for the capacitor $C_4$ and the values of the two components are chosen to ensure a suitably short time constant compared with the duration of one half-cycle of the AC supply.

When the master SCR of $TR_1$ fires, current will flow from the live side L of the AC line (L having therefore applied a positive half-cycle at this time), through the heating coils H of the chromatographic oven (or in general through the electrical load being controlled) and the anode-to-cathode path of the master SCR, denoted by arrow $Y_1$, to the neutral N. Current will also flow in the chain shunted across the coils H, which comprises diode $D_1$, resistor $R_7$ and resistor $R_8$. Capacitor $C_5$, which is in parallel with $R_8$, charges up in the polarity shown and tends to follow the voltage drop set up by current flow through resistor $R_8$, a flow which is substantially limited by the series resistor $R_7$, which is much higher in value than $R_8$. When the voltage at $C_5$ reaches the gate threshold of slave triggering triac $TR_2$, the downward path of $TR_2$ denoted by arrow $Y_2$ becomes conductive and although a potential drop is developed across the gate and cathode of $TR_1$ as a result of current flowing through $TR_2$ and $R_5$ in the positive halfcycle it will have no effect on the gate since the gate will have lost control earlier upon the master SCR in $TR_1$ switching on.

Shortly after the AC waveform crosses the zero line into the negative half-cycle (as measured at the live side L), the voltage at the gate of $TR_2$ produced by the charge stored in $C_5$ again fires $TR_2$ which this time conducts in the opposite direction denoted by arrow $X_2$. Current is now flowing from neutral N, through resistor $R_5$, through path $X_2$, through heating coils H, to live L; and the voltage drop across $R_5$ is effective between gate and cathode of $TR_1$ in switching on the slave SCR of $TR_1$ in path $X_1$. Not long after, capacitor $C_5$ will have been substantially discharged through $R_8$, the $C_5R_8$ time constant being made conveniently shorter than the duration of one half-cycle of the AC supply.

In FIG. 3 the gate pulse for $TR_2$ passes through a resistor $R_9$ to limit gate current. A further auxiliary feature of this circuit is the means for preventing a high rate of voltage change across $TR_1$, in the form of series-connected resistor $R_{10}$ and capacitor $C_6$, connected across $TR_1$.

As noted earlier, the trigger pulse generator at 5 in FIG. 2 will produce a pulse if the original sensor circuit 2 has indicated that a complete cycle of AC power should be applied to the heater (by the triac circuit 8 in FIG. 2, just described in detail relative to FIG. 3). As also previously stated, the trigger pulse from circuit 5 can only occur when the AC waveform changes from its negative to positive half-cycle, since the synchronizing circuit 6 (in both FIGS. 1 and 2) enables the trigger pulse generator only at such times by supplying a timing pulse thereto only during this type of zero crossing of the AC voltage. It is, of course, the trigger pulse from circuit 5 that, after being stretched by circuit 7 (to insure that the pulse is sustained for a short time into the beginning of the positive half-cycle of the main AC voltage) which is supplied to the transformer T in FIG. 3 to cause the operation of this triac circuit as just explained. An exemplary circuit for generating the synchronizing pulse, just before the AC voltage crosses zero at the end of the negative half-cycle, is shown in detail in FIG. 4.

Referring to FIG. 4, the unijunction U shown in FIG. 1 has been repeated, the emitter of which is controlled by the trigger pulse control circuit of the remainder of FIG. 1. The synchronizing circuit of FIG. 4 is somewhat different from elements $R_2$, $R_3$, $C_3$ and 6 in FIG. 1, but performs the same function. $R_3$ is the $B_1$ base resistor connected as in FIG. 1 and the unijunction U produces an output pulse at terminal O, again as in FIG. 1. The resistor $R_{11}$ of base $B_2$ instead of being connected straight (as is $R_2$ in FIG. 1) to the rail $P_r$, which is always maintained, say, 24 volts positive with respect to ground (i.e., by a constant voltage source), is fed from the center junction between two equal resistors $R_{12}$ and $R_{13}$ each, say, 1K ohms in value, strung in series between the positive rail and ground. This means that if no further circuit provisions were made $R_{11}$ would be fed from a point 12 volts positive relative to ground. In fact, a normally closed (conducting) switch means across $R_{12}$ causes the right-hand end of $R_{11}$ to be normally at about 24 volts above ground, and the switch means is opened (i.e., becomes non-conducting) when the AC waveform is near the end of the negative half-cycle, so that at that instant the voltage feeding $R_{11}$ is halved. At such times, the unijunction will "fire" if its gate voltage is greater than threshold voltage, $V_p$, as explained relative to FIG. 1. The switch means comprises a transistor TR normally biased into conduction by resistor $R_{14}$; capacitor $C_7$ in series with resistor $R_{15}$ is connected in its base-emitter circuit. Capacitor $C_7$ charges up when a voltage drop is set up across $R_{15}$ by current flowing therethrough in the direction of arrow A as permitted by diode $D_2$ returned to a terminal $T_1$, which together with terminal $T_2$ receives, say, 30 volts AC from the common AC supply, the connection of resistor $R_{15}$ and diode $D_2$ being effected through a series resistor $R_{16}$.

The current flow (in the direction indicated at A) through resistor $R_{15}$ will of course occur only when its lower end is negative relative to its upper end; if diode $D_2$ had no threshold value, then such current would flow during the entire period of each negative half-cycle (as seen at $T_1$) of the AC waveform across $T_1$ and $T_2$. However the relatively small (say, ½ volt) forward threshold voltage of $D_2$ blocks the effect of the negative voltage on $T_1$ whenever this voltage is less negative than the threshold voltage (e.g., is not as negative as −½ volt). Thus no current flows through resistor $R_{15}$ at the very beginning and end of each of the negative half-cycles. A pair of limiting diodes $D_3$ and $D_4$ connected across resistor $R_{15}$ shunt the voltage in excess of their combined threshold voltages (e.g., 1 volt); thus as the negative half-cycle voltage increases in value (i.e., becomes more negative) at $T_1$, the lower end of resistor $R_{15}$ is maintained at a moderate negative voltage (e.g., $-1$ volt) relative to its upper end. Thus as a result of the co-action of the pair of shunting diodes and the diode $D_2$, the (voltage) waveform across $R_{15}$ is a negative substantially square wave of limited amplitude, starting slightly after and ending slightly before the zero crossing point of the negative half-cycle of the original AC wave at $T_1$ (the current flow A of course following this waveform across resistance $R_{15}$). The leading (negative) edge of this square wave will be differentiated by capacitor $C_7$, so that a negative pulse is applied to the base of switching transistor TR (tending to draw more current therefrom), which will merely tend to maintain transistor TR in its conducting (on) condition. The trailing edge of the square wave (which goes from negative toward the positive direction) will also be differentiated by $C_7$, so as to produce a positive pulse at the base of transistor TR (tending to cause current flow into the base). Since substantially no current will be flowing through resistor $R_{15}$ at this time (since this corresponds to very near the end of the negative cycle of the original AC waveform as measured at $T_1$ relative to $T_2$), this positive pulse will actually render the base of TR positive relative to the voltage at its emitter. Stated in other terms, the capacitor $C_7$ which has been charged by the negative square wave (its left side being relatively positive) will now discharge (since its right side is no longer maintained negative) so as to supply current to the base, thereby cutting off (i.e., rendering nonconductive) transistor TR. This cutting off of TR will drop the voltage (e.g., from about $+24$ to about $+12$ volts) applied to resistor $R_{11}$ at the base $B_2$ of unijunction U (by effectively placing previously shunted $R_{12}$ back in the circuit), thus causing a short pulse at output O, provided the emitter voltage of U is above its firing threshold for this reduced base ($B_2$) voltage, as previously explained.

In order to insure that the trigger generator output pulse at 0 (which necessarily starts just before the end of the negative half-cycle of the main AC voltage because of the action of the FIG. 4 synchronizing circuit just described) persists into the early part of the positive half-cycle to turn on the triac circuit of FIG. 3, a pulse stretcher indicated at 7 in FIG. 2 is provided between 5 and 8 in FIG. 2 (i.e., between the pulse generating circuits of FIGS. 1 and 4 and the triac circuit of FIG. 3, respectively). Such a pulse stretching circuit may comprise the exemplary circuit shown in detail in FIG. 5. The FIG. 5 stretcher may be supplied from the same 24 volt positive rail $P_r$ and ground as shown in FIG. 4. The stretcher comprises a complementary pair of transistors $TR_A$ and $TR_B$. The input to the base of $TR_A$ may be directly connected to terminal 0 in FIG. 4. When a (positive) pulse appears at terminal 0, $TR_A$ conducts, capacitor $C_8$ dumping its charge into $TR_A$ through resistor $R_{17}$. After the discharge has occurred, charging current flows through resistors $R_{18}$ and $R_{19}$ and capacitor $C_8$, with the result that the base of $TR_B$ becomes less positive than its emitter, $TR_B$ turns on and current flows therethrough into the load resistor $R_{20}$ and the capacitor $C_9$. As long as the charging current to $C_8$ lasts (and this depends on the chosen values of the components involved), $TR_B$ remains conducting; and as $C_9$ charges up, a generally increasing DC level is available across the primary of the pulse transformer T, which is the same transformer as shown in FIG. 3.

As the voltage across the primary of transformer T (FIG. 5) reaches the full DC level, an output voltage of a given sign is produced at the terminals of the secondary (FIG. 3). Secondary voltage occurs just before the AC waveform has become positive and lasts until the mains waveform has gone substantially positive. This secondary voltage is effective in firing the master SCR of triac $TR_1$ as previously explained relative to the description of the FIG. 3 circuit.

Whether a pulse occurs at O (see FIGS. 1 and 4) at the next possible interval (just before the next negative half-cycle ends because of the synchronizing action of the FIG. 4 circuit and in particular the cutting off of TR therein) will of course depend on whether the voltage at the upper end of capacitor $C_2$ (FIG. 1) has reached a sufficient value to fire unijunction U. As previously explained this in turn depends on the relative values of $C_1$, $C_2$ and $R_1$ in FIG. 1 and of course on the input signal to the trigger pulse generator. This input may be occasioned by a pure open loop type signal as at S (and P) in FIG. 1, a signal representing a measured condition (e.g., oven temperature) caused by the controlled device (e.g., oven heater) relative to a desired condition (e.g., reference voltage or setpoint temperature) as at 1-4 in FIG. 2, or such a measured condition signal algebraically added to a fixed (but adjustable) input level, representing the expected (average) power demand (so that the measured condition signal acts as a closed loop fine adjustment of the open-loop approximate input level). Thus the synchronized trigger generator and associated AC controller system of the invention may be used in an open loop mode, closed loop mode, or a mixed mode of operation to control the ultimate electrical device (e.g., oven heater).

What is claimed is:

1. A synchronous electrical pulse generator for producing pulses at any of a predetermined series of discrete, equally spaced time intervals, the time average of the number of pulses actually produced being substantially proportional to the level of a variable DC input signal, comprising;

a first charge storage means receiving said variable DC input signal and charging up to a level determined thereby;

a second charge storage means chargeable from said first storage means;

a sometimes-enabled threshold-firing device connected to said second charge storage means for at least partially discharging said second storage means as a pulse when the charge built up therein causes the voltage across said second storage means to reach at least the threshold value of said threshold-firing device:

a paralleling means between said first and said second storage means, allowing said second storage means to be charged from said first storage means but preventing said first storage means from being substantially discharged when said threshold value of said threshold device is exceeded;

and timing means controllingly connected to said threshold-firing device to synchronously enable it to fire only at predetermined equally spaced time intervals, said timing means comprising a voltage-level detector for causing enablement of said threshold-firing device just before a particular polarity half-cycle of a reference AC voltage waveform reaches the zero-voltage crossover, whereby for a particular chosen first and second storage means and paralleling means, the level of the variable DC input signal determines the time, after the threshold-firing device has fired and thereby generated a pulse by discharging the second charge storage means, that the charge in said second charge storage means again builds up to cause its voltage to reach said threshold value thereby causing the threshold-firing device as controlled by the timing means to again fire upon the concurrence of the next synchronous time interval determined by the next particular polarity half-cycle of the reference AC voltage waveform.

2. A synchronous pulse generator according to claim 1, in which:
said paralleling means comprises a resistor.

3. A synchronous pulse generator according to claim 1, in which:
said paralleling means comprises a switching means.

4. A synchronous pulse generator according to claim 1, further comprising:
a pulse stretching circuit operatively connected to the pulse output of said threshold-firing device to cause stretching of each said pulse to insure that each stretched pulse lasts beyond said zero-voltage crossover and therefore into the beginning of the next succeeding opposite polarity half-cycle of said reference AC voltage waveform.

5. A synchronous pulse generator according to claim 4, further comprising:
a power control circuit of the type operative to switchably pass AC power to a load after a zero-voltage crossing when said circuit receives a switch-on pulse during such crossing;

said power control circuit receiving and being controlled by said stretched pulses from said pulse stretching circuit, and controlling AC power which is at least in phase with said reference AC voltage waveform, whereby said power control circuit passes an incremental amount of said AC power to the load every time a stretched pulse is generated.

6. A synchronous pulse generator according to claim 5, further comprising;
adjustable means for setting a chosen input level at the input to said first charge storage means,
said chosen level corresponding to a particular expected power demand level to be supplied to the load,
whereby said adjustable means acts as a proportional control of the power supplied to the load.

7. A synchronous pulse generator according to claim 5, further comprising;
means for sensing a quantitative condition of the load powered by said power control circuit relative to a reference level;
said sensing means having its output ultimately connected to the input to said first charge storage means;
whereby a closed loop control is obtained in that the relative quantitative condition of the load adjusts the actual power supplied to the load.

* * * * *